US008868276B2

(12) United States Patent
Tanishima et al.

(10) Patent No.: US 8,868,276 B2
(45) Date of Patent: Oct. 21, 2014

(54) HYBRID VEHICLE CONTROL DEVICE

(75) Inventors: Kaori Tanishima, Isehara (JP); Hiroaki Kawamura, Sagamihara (JP); Fumihiro Yamanaka, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/879,776

(22) PCT Filed: Oct. 21, 2011

(86) PCT No.: PCT/JP2011/074283
§ 371 (c)(1),
(2), (4) Date: May 22, 2013

(87) PCT Pub. No.: WO2012/053633
PCT Pub. Date: Apr. 26, 2012

(65) Prior Publication Data
US 2013/0231815 A1 Sep. 5, 2013

(30) Foreign Application Priority Data
Oct. 22, 2010 (JP) .................................. 2010-237261

(51) Int. Cl.
| B60W 20/00 | (2006.01) |
| B60W 10/06 | (2006.01) |
| B60W 10/10 | (2012.01) |
| B60W 10/08 | (2006.01) |
| B60W 30/192 | (2012.01) |
| B60L 11/14 | (2006.01) |
| B60L 15/20 | (2006.01) |
| B60K 6/48 | (2007.10) |
| B60W 10/115 | (2012.01) |
| B60W 10/11 | (2012.01) |
| B60W 30/19 | (2012.01) |

(52) U.S. Cl.
CPC .......... *B60W 20/20* (2013.01); *B60L 2240/443* (2013.01); *Y02T 10/6286* (2013.01); *Y02T 10/7077* (2013.01); *B60L 2240/486* (2013.01); *B60W 20/40* (2013.01); *B60W 10/08* (2013.01); *B60L 2220/14* (2013.01); *B60L 2240/461* (2013.01); *Y02T 10/84* (2013.01); *B60L 2240/421* (2013.01); *B60L 2210/40* (2013.01); *B60L 2240/12* (2013.01); *Y02T 10/6291* (2013.01); *B60W 2600/00* (2013.01); *B60W 30/192* (2013.01); *B60L 11/14* (2013.01); *Y02T 10/7241* (2013.01); *B60L 2240/507* (2013.01); *Y02T 10/6221* (2013.01); *B60L 2240/441* (2013.01); *B60L 2210/30* (2013.01); *B60L 15/2009* (2013.01); *B60L 2240/423* (2013.01); *B60K 6/48* (2013.01); *B60W 10/115* (2013.01); *B60W 10/11* (2013.01); *B60W 10/06* (2013.01); *B60W 30/19* (2013.01); *Y10S 903/93* (2013.01); *B60W 20/00* (2013.01); *B60L 2270/145* (2013.01); *Y02T 10/642* (2013.01)
USPC ............................................. 701/22; 903/930

(58) Field of Classification Search
CPC .................... B60W 30/192; Y02T 10/6291
USPC ............................................................ 701/22
See application file for complete search history.

(56) References Cited

U.S. PATENT DOCUMENTS 5,982,045 A * 11/1999 Tabata et al. .................... 290/17
7,108,630 B2 * 9/2006 Ozeki et al. ...................... 477/3
(Continued)

FOREIGN PATENT DOCUMENTS

| JP | 10-002241 A | 1/1998 |
| JP | 2006315484 A * | 11/2006 |

(Continued)

OTHER PUBLICATIONS

JPO machine translation of JP 2006-315484 (original JP document published Nov. 24, 2006).*

*Primary Examiner* — Behrang Badii
*Assistant Examiner* — David Testardi
(74) *Attorney, Agent, or Firm* — Global IP Counselors, LLP

(57) ABSTRACT

A hybrid vehicle control device is provided with an engine, a motor and a mode switch section, an automatic transmission and a controller. The controller outputs the gear shift command prior to an engine start command when a simultaneous output prediction condition is met that predicts the output of a gear shift request and a start request at the same time. In this way, the generation of a large shock by the entering of the engine start in the start prohibiting region during the gear shift is prevented.

8 Claims, 6 Drawing Sheets

(56) References Cited

U.S. PATENT DOCUMENTS

| | | | |
|---|---|---|---|
| 7,469,758 B2 * | 12/2008 | Iwanaka et al. | 180/65.1 |
| 7,474,012 B2 * | 1/2009 | Tabata et al. | 290/40 C |
| 7,670,258 B2 * | 3/2010 | Kamada et al. | 477/77 |
| 7,766,107 B2 * | 8/2010 | Joe et al. | 180/65.21 |
| 7,975,791 B2 * | 7/2011 | Nozaki et al. | 180/65.6 |
| 7,998,021 B2 * | 8/2011 | Matsubara et al. | 477/3 |
| 8,007,402 B2 * | 8/2011 | Tabata et al. | 477/3 |
| 8,204,659 B2 * | 6/2012 | Kouno et al. | 701/55 |
| 8,393,995 B2 * | 3/2013 | Imamura et al. | 477/3 |
| 2007/0056783 A1 | 3/2007 | Joe et al. | |
| 2013/0124027 A1 * | 5/2013 | Tanishima et al. | 701/22 |

FOREIGN PATENT DOCUMENTS

| | | | |
|---|---|---|---|
| JP | 2007-069789 A | | 3/2007 |
| JP | 2008179242 A | * | 8/2008 |
| JP | 2010030486 A | * | 2/2010 |
| JP | 2010083351 A | * | 4/2010 |
| JP | 2010-215189 A | | 9/2010 |

* cited by examiner

|  | B1 Fr/B | C1 I/C | C2 D/C | C3 H&LR/C | B2 LOW/B | B3 2346/B | B4 R/B | F1 1st OWC | F2 1&2 OWC |
|---|---|---|---|---|---|---|---|---|---|
| 1st | (O) |  |  | (O) | O |  |  | O | O |
| 2nd |  |  |  | (O) | O | O |  |  | O |
| 3rd |  |  | O |  | O | O |  |  |  |
| 4th |  |  | O | O |  | O |  |  |  |
| 5th |  | O | O | O |  |  |  |  |  |
| 6th |  | O |  | O |  | O |  |  |  |
| 7th | O | O |  | O |  |  |  | O |  |
| Rev. | O |  |  | O |  |  | O |  |  |

HYBRID VEHICLE CONTROL DEVICE

CROSS-REFERENCE TO RELATED APPLICATIONS

This application is a U.S. National stage of International Application No. PCT/JP2011/074283, filed Oct. 21, 2011. This application claims priority to Japanese Patent Application No. 2010-237261, filed with Japan Patent Office on Oct. 22, 2010.

BACKGROUND

1. Field of the Invention

The present invention relates to a hybrid vehicle control device comprising an engine and an automatic transmission in the driving system.

2. Background Information

In a control device of the hybrid vehicle in the prior art, in order to prevent shock caused by simultaneous engine start control and gear shift control, there is a scheme in which the engine start control and the gear shift control are arranged as exclusive processes. That is, if the engine start control comes first, the gear shift control can be started only after the end of the engine start control. On the contrary, if the gear shift control comes first, the engine start control can be started only after the end of the gear shift control (for example, see Japanese Laid Open Patent Application No. 10-2241).

SUMMARY

However, the control device of the hybrid vehicle in the prior art has some problems. Here, an engine start controller and a gear shift controller are connected to each other via a two-way communication line, and the information calculated in the controllers is exchanged to carry out control of the two controllers. Consequently, due to a delay in the communication between the two controllers and a delay in the operation, if the signal for the start request and the signal for the gear shift request are sent at the same time, the condition for not carrying out the processes for the engine start and the gear shift is also treated at the same time. In this case, as the engine start control enters the start-prohibiting region during the gear shift control, a large shock may take place. This is undesirable.

The purpose of the present invention is to solve the problems by providing a hybrid vehicle control device that can prevent the large shock from taking place due to entering the engine start in the start prohibiting region during the gear shift control.

In order to realize the purpose, the hybrid vehicle control device of the present invention comprises an engine, a motor, a mode switch means, an automatic transmission, and a controller. The motor is arranged in the driving system between the engine and the drive wheels, and the motor carries out the start of the engine and the driving of the drive wheels. The mode switch means is arranged in the connecting section between the engine and the motor, and the mode switch means switches the mode between the hybrid vehicle mode, in which the engine and the motor are taken as the driving sources, and the electrically driven vehicle mode, in which only the motor is taken as the driving source. The automatic transmission is included between the motor and the drive wheels, and the automatic transmission includes plural gear-shift steps with different gear-shift ratios, respectively. The controller carries out control of starting the engine based on the start request when mode transition takes place from the electrically driven vehicle mode to the hybrid vehicle mode based on the start request; at the same time, the controller carries out the gear shift control for the transition of the gear-shift step of the automatic transmission from the current gear-shift step to the requested gear-shift step based on the gear shift request. In addition, the controller outputs a gear shift command prior to the engine start command when the simultaneous output prediction condition, which predicts the output of the gear shift request and the start request at the same time, is met.

Consequently, when the simultaneous output prediction condition, which predicts the output of the gear shift request and the start request at the same time, is met, the controller outputs a gear shift command prior to the engine start command. That is, when both the simultaneous output prediction condition and the gear shift command priority permission condition are met together, the following time sequence is adopted: output of the gear shift command according to the prediction timing→output of the gear shift request or the start request due to the crossing of the gear shift line or the start line→output of the engine start command. That is, the time difference process is carried out to guarantee that the output of the gear shift command occurs prior to the output of the engine start command. Consequently, by means of the gear shift priority command based on the prediction, it is possible to reliably avoid simultaneous process caused by entering the engine start in the start-prohibiting region during the gear shift control. As a result, it is possible to prevent the generation of a large shock due to entering of the engine start in the start prohibiting region during the gear shift control.

BEST MODES FOR WORKING THE INVENTION

In the following, the optimum embodiment for realizing the control device of the hybrid vehicle of the present invention will be explained with reference to one embodiment of the invention illustrated with the drawings.

Embodiment 1

Figure 1:
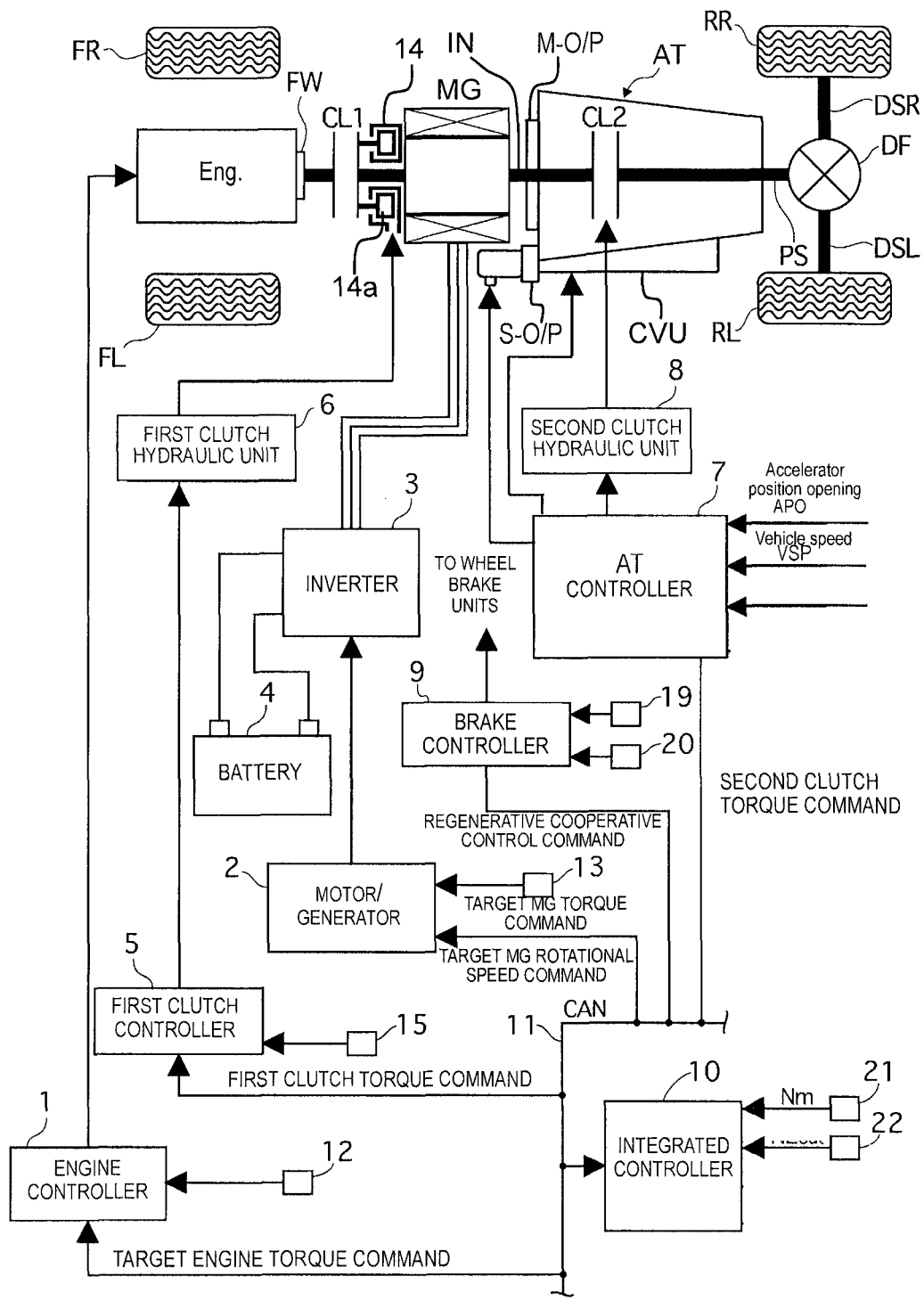
FIG. 1 is an overall schematic block diagram illustrating an FR hybrid vehicle (an example of the hybrid vehicles) with rear-wheel drive equipped with a control device in one embodiment of the present invention.

First, the configuration will be explained. FIG. 1 is an overall system diagram illustrating the hybrid vehicle with rear-wheel drive wherein the control device is applied in one embodiment of the present invention.

As shown in FIG. 1, the driving system of the FR hybrid vehicle in one embodiment of the present invention comprises an engine ENG, a flywheel FW, a first clutch CL1 (a mode switch means), a motor/generator MG (a motor), a second clutch CL2, an automatic transmission AT, a transmission input shaft IN, a mechanical oil pump M-O/P, a sub oil pump S-O/P, a propeller shaft PS, a differential unit DF, a left drive shaft DSL, a right drive shaft DSR, and a left rear wheel RL (a drive wheel) and a right rear wheel RR (a drive wheel). In addition, there are a left front wheel FL and a right front wheel FR.

The engine ENG is a gasoline engine or a diesel engine. Based on the engine control command from the engine controller 1, the engine carries out the engine start control, the engine shutdown control, the valve position control for the throttle valve, the fuel cut control, etc. In addition, the flywheel FW is arranged on the engine output shaft.

The first clutch CL1 is a clutch included between the engine ENG and the motor/generator MG. Based on the first clutch control command from the first clutch controller 5, the first clutch controls the switching of the mode to the engaged mode, the semi-engaged mode, or the disengaged mode by the first clutch control hydraulic pressure generated by the first clutch hydraulic unit 6. For example, the first clutch CL1 may be made of a dry-type side plate clutch of the normal close type, which can ensure complete engagement by the energizing force of a diaphragm spring and which can be controlled to any of the states of complete engagement, slip engagement, and complete disengagement under the stroke control using the hydraulic actuator 14 having a piston 14a.

The motor/generator MG is a synchronization-type motor/generator that has a permanent magnet embedded in the rotor and has a stator coil wound on the stator. Based on the control command from the motor/generator 2, the motor/generator MG is controlled by applying a 3-phase AC power generated by the inverter 3. This motor/generator MG can work as a motor driven to rotate by an electric power fed from the battery 4 (the powering mode) and can also work as an electric power generator that generates an electromotive force at the two ends of the stator when the rotor receives a rotating energy from the engine ENG or the drive wheels, so that the motor generator MG can charge the battery 4 (the regeneration mode). The rotor of the motor/generator MG is connected to the transmission input shaft IN of the automatic transmission AT.

The second clutch CL2 is a clutch included between the motor/generator MG and the left rear wheel RL and right rear wheel RR. Based on the second clutch control command from the AT controller 7, the second clutch is set to any of the modes of engagement, slip engagement and disengagement under the control hydraulic pressure generated by the second clutch hydraulic unit 8. The second clutch CL2 may be made of a normal open-type, wet-type, multi-plate clutch or a wet-type, multi-plate brake that can continuously control the hydraulic fluid flow rate and the hydraulic pressure by means of a proportional solenoid. Here, the first clutch hydraulic unit 6 and the second clutch hydraulic unit 8 are included in the hydraulic control valve unit CVU annexed to the automatic transmission AT.

The automatic transmission AT is a step transmission that can automatically switches to one of the gear-shift steps corresponding to the vehicle speed, the accelerator position, etc. In one embodiment of the present invention, the step transmission has 7 forward gear-shift steps and 1 backwards gear-shift step. In one embodiment of the present invention, the second clutch CL2 is not arranged as a stand-alone dedicated clutch from that automatic transmission AT. Instead, the second clutch is formed by selecting an appropriate frictional element (the clutch or the brake) corresponding to the prescribed condition among the plural frictional elements engaged in the various gear-shift steps of the automatic transmission AT.

On the transmission input shaft IN (equal to the motor shaft) of the automatic transmission AT, a mechanical oil pump M-O/P driven by the transmission input shaft IN is arranged. When the ejecting pressure from the mechanical oil pump M-O/P is insufficient due to stopping the vehicle or the like, in order to prevent a decrease in the hydraulic pressure, a sub oil pump S-O/P driven by an electrically driven motor is arranged in the motor housing or the like. Here, the driving control for the sub oil pump S-O/P is carried out by the AT controller 7 to be explained later.

The propeller shaft PS is connected to the transmission output shaft of the automatic transmission AT. This propeller shaft PS is connected to the left rear wheel RL and right rear wheel RR via the differential unit DF, the left drive shaft DSL and the right drive shaft DSR.

The FR hybrid vehicle can take the electrically driven vehicle mode (hereinafter to be referred to as the "EV mode"), the hybrid vehicle mode (hereinafter to be referred to as the "HEV mode"), and the driving torque control mode (hereinafter to be referred to as the "WSC mode") as the running modes corresponding to the different driving states, respectively.

The "EV mode" refers to the running mode in which the first clutch CL 1 is disengaged, and the vehicle runs only with the drive torque of the motor/generator MG; the "EV mode" includes the motor running mode and the regeneration running mode. The "EV mode" is selected when the requested drive torque is low and the battery SOC is guaranteed.

The "HEV mode" refers to the mode in which the vehicle runs while the first clutch CL1 is engaged. The "HEV mode" includes the motor assist running mode, the electric power generation running mode, and the engine running mode. The vehicle can run in any of these modes. The "HEV mode" is selected when the requested drive torque is high or when the battery SOC is insufficient.

The "WSC mode" refers to the mode in which, under the rotational speed control of the motor/generator MG, the second clutch CL2 is kept in the slip engagement state, and the clutch transmission torque going through the second clutch CL2 becomes the requested driving torque determined corresponding to the vehicle state and the manipulation of the driver, as the clutch torque capacity is controlled while the vehicle runs. This "WSC mode" is selected when the vehicle is in the running region where the engine rotational speed becomes lower than the idle rotational speed, such as when the vehicle stops, starts, decelerates, etc. while the "HEV mode" is selected.

In the following, the control device of the FR hybrid vehicle will be explained. As shown in FIG. 1, the control device of the FR hybrid vehicle in one embodiment of the present invention comprises a controller 1, a motor/generator 2, an inverter 3, a battery 4, a first clutch controller 5, a first clutch hydraulic unit 6, an AT controller 7 (a controller and a gear shift controller), a second clutch hydraulic unit 8, a brake controller 9, and an integrated controller 10 (a controller and an engine start controller). Here, the controllers 1, 2, 5, 7, and 9 and the integrated controller 10 are connected with each other via a CAN communication line 11 that allows for the exchange of information.

The engine controller 1 has the engine rotational speed information from the engine rotational speed sensor 12, the target engine torque command from the integrated controller 10, and other necessary information input into the engine controller. The engine controller then outputs the commands for controlling the engine driving points (Ne, Te) to the throttle valve actuator, etc. of the engine ENG.

The motor/generator 2 has the information from a solenoid 13 that detects the rotor's rotating position of the motor/generator MG, the target MG torque command and the target MG rotational speed command from the integrated controller 10 and other necessary information input into the motor/generator. Then, the command for controlling the motor driving point (Nm, Tm) of the motor/generator MG is output to the inverter 3. In this motor/generator 2, the battery SOC that represents the charging capacity of the battery 4 is monitored, and this battery SOC information is sent via the CAN communication line 11 to the integrated controller 10.

The first clutch controller 5 has the sensor information from the first clutch stroke sensor 15 that detects the stroke position of the piston 14a of the hydraulic actuator 14, the first clutch CL1 command from the integrated controller 10, and other necessary information input into the first clutch controller. Then, the first clutch controller outputs the command for setting the first clutch CL1 to the state of engagement, semi-engagement or disengagement to the first clutch hydraulic unit 6 in the hydraulic control valve unit CVU.

Figure 2:
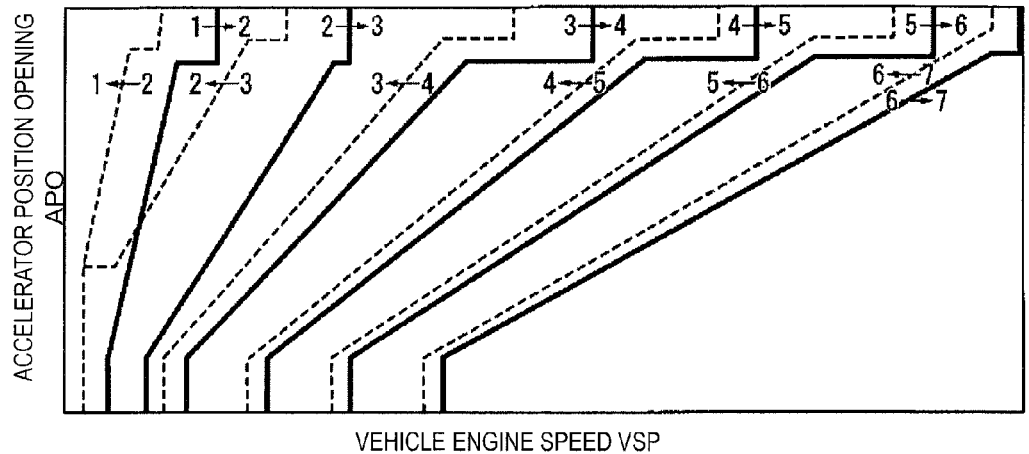
FIG. 2 is a diagram illustrating an example of a shift map (equal to the shift schedule) of an automatic transmission AT set in an AT controller 7 in one embodiment of the present invention.

The AT controller 7 has the information from the accelerator position opening sensor 16, the vehicle speed sensor 17, and the other sensors 18 input into the AT controller. Then, when the vehicle runs while selecting the D-range, for the driving point determined according to the accelerator position opening APO and the vehicle speed VSP, the optimum gear-shift step is searched from the position present on the shift map shown in FIG. 2, and a control command for reaching the searched gear-shift step is output to the hydraulic control valve unit CVU. As shown in FIG. 2, the shift map refers to the map where the up gear shift line and the down gear shift line are depicted corresponding to the accelerator position opening APO and the vehicle speed VSP. In addition to the gear shift control, when the target CL2 torque command from the integrated controller 10 is input, the command for controlling the slip engagement of the second clutch CL2 is output to the second clutch hydraulic unit 8 in the hydraulic control valve unit CVU as the second clutch control.

The brake controller 9 has the sensor information from the wheel speed sensors 19 that detect the wheel speeds of the four wheels, the sensor information from the integrated controller 20, the regenerative cooperative control command from the integrated controller 10, and other necessary information input into the brake controller. Then, for example, in the case of the brake step-down control, if the regenerated braking force alone cannot meet the requested braking force determined from the brake stroke BS, the insufficient portion is supplemented by the mechanical braking force (the hydraulic braking force and the motor braking force) as the regenerative cooperative brake control is carried out.

The integrated controller 10 has the function for managing the overall energy consumption of the vehicle and for ensuring that the vehicle runs at the highest efficiency. The necessary information from the motor rotational speed sensor 21 that detects the motor rotational speed Nm and from other sensors/switches 22 are input into the integrated controller via the CAN communication line 11. Then, the integrated controller outputs the target engine torque command to the engine controller 1, the target MG torque command and the target MG rotational speed command to the motor/generator 2, the target CL 1 torque command to the first clutch controller 5, the target CL2 torque command to the AT controller 7, and the regenerative cooperative control command to the brake controller 9.

In the integrated controller 10, there is a mode selection unit that works as follows: for the driving point determined from the accelerator position opening APO and the vehicle speed VSP, the optimum running mode is searched from the position present on the EV-HEV selection map shown in FIG. 3, and the searched running mode is taken as the target running mode. On the EV-HEV selection map, the following switching lines are set: the EV→HEV switching line that switches the mode from the "EV mode" to the "HEV mode" as the driving point (APO, VSP) present in the EV region is crossed; the HEV→EV switching line that switches the mode from the "HEY mode" to the "EV mode" as the driving point (APO, VSP) present in the HEV region is crossed; and the HEV→WSC switching line that switches the mode to the "WSC mode" when the driving point (APO, VSP) enters the WSC region as the "HEV mode" is selected. The HEV→EV switching line and the HEV→EV switching line are set as the lines that divide the EV region and the HEV region, with a hysteresis quantity. The HEV→WSC switching line is set along the first set vehicle speed VSP1 where the engine ENG maintains the idle rotational speed when the automatic transmission AT is in the first gear-shift step. However, if the battery SOC becomes lower than a prescribed level during the selection of the "EV mode," the "HEV mode" is forcibly set as the target running mode.

Figures 4, 5:
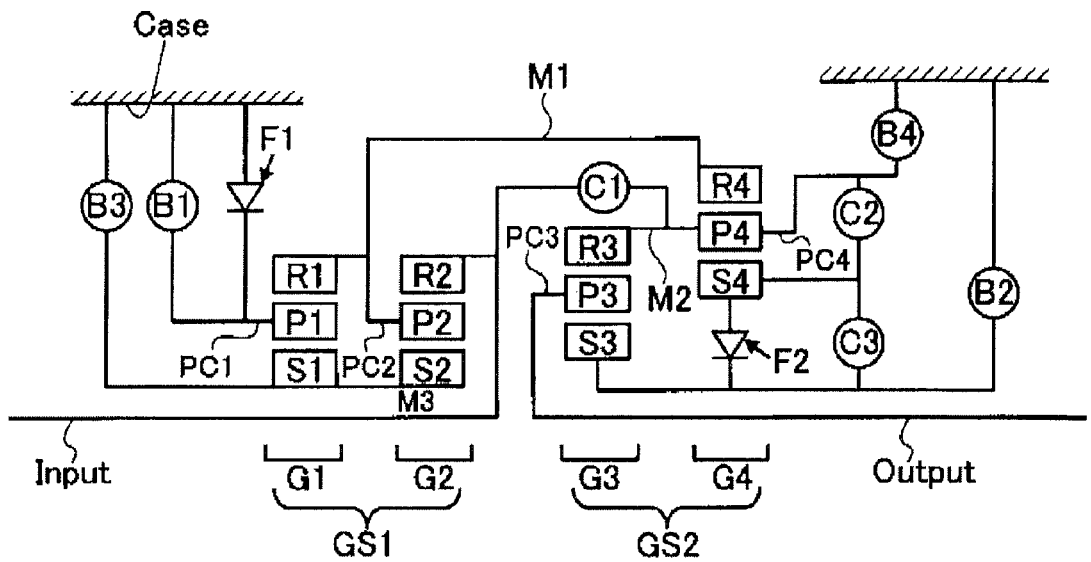
FIG. 4 is a skeleton diagram illustrating an example of the automatic transmission AT carried on the FR hybrid vehicle wherein the control device in one embodiment of the present invention is adopted.
FIG. 5 is an engagement operation table illustrating the engagement state of the various frictional elements for each of the gear-shift steps in the automatic transmission AT carried on the FR hybrid vehicle wherein the control device in one embodiment of the present invention is adopted.

FIG. 4 is a skeleton diagram illustrating an example of the automatic transmission AT carried on the FR hybrid vehicle wherein the control device in one embodiment of the present invention is adopted.

The automatic transmission AT is a step-type automatic transmission having 7 forward gear-shift steps and 1 backwards gear-shift step. The drive torque from the engine ENG and/or the motor/generator MG is input from the transmission input shaft INPUT, the rotational speed is then gear shifted by the 4 planetary gears and the 7 frictional elements, and the gear shifted power is then output from the transmission output shaft OUTPUT.

The transmission gear mechanism has the following gears sequentially arranged on the shaft from the transmission input shaft INPUT side to the transmission output shaft OUTPUT side: the first planetary gear set as GS1 comprising the first planetary gear G1 and the second planetary gear G2 and the second planetary gear set as GS2 comprising the third planetary gear G3 and the fourth planetary gear G4. In addition, the following frictional elements are arranged: the first clutch C1, the second clutch C2, the third clutch C3, the first brake B1, the second brake B2, the third brake B3, and the fourth brake B4. Also, the first one-way clutch F1 and the second one-way clutch F2 are arranged.

The first planetary gear G1 is a single pinion-type planetary gear having a first sun gear S1, a first ring gear R1, a first pinion P1, and a first carrier PC1. The second planetary gear G2 is a single pinion-type planetary gear having a second sun gear S2, a second ring gear R2, a second pinion P2, and a second carrier PC2. The third planetary gear G3 is a single pinion-type planetary gear having a third sun gear S3, a third ring gear R3, a third pinion P3, and a third carrier PC3. The fourth planetary gear G4 is a single pinion-type planetary gear having a fourth sun gear S4, a fourth ring gear R4, a fourth pinion P4, and a fourth carrier PC4.

The transmission input shaft INPUT is connected to the second ring gear R2 and has the rotation drive torque from the engine ENG and/or the motor/generator MG input into the transmission input shaft. The transmission output shaft OUTPUT is connected to the third carrier PC3 and transmits the output rotation drive torque via the final gear, etc. to the drive wheels (the left rear wheel RL and the right rear wheel RR).

The first ring gear R1, the second carrier PC2, and the fourth ring gear R4 are monolithically connected to each other by the first connecting member M1. The third ring gear R3 and the fourth carrier PC4 are monolithically connected to each other by the second connecting member M2. The first sun gear S1 and the second sun gear S2 are monolithically connected to each other by the third connecting member M3.

The first clutch C1 (equal to the input clutch I/C) is a clutch that selectively connects/disconnects the transmission input shaft INPUT and the second connecting member M2. The second clutch C2 (equal to the direct clutch D/C) is a clutch that selectively connects/disconnects the fourth sun gear S4 and the fourth carrier PC4. The third clutch C3 (equal to the H&L R clutch H&L R/C) is a clutch that selectively connects/disconnects the third sun gear S3 and the fourth sun gear S4. The second one-way clutch F2 (equal to the 1 & 2-speed, one-way clutch 1 &2OWC) is arranged between the third sun gear S3 and the fourth sun gear S4. The first brake B1 (equal to the front brake Fr/B) is a brake that selectively stops the rotation of the first carrier PC1 with respect to the transmission case Case. The first one-way clutch F1 (equal to the 1-speed, one-way clutch 1stOWC) is arranged side by side with the first brake B1. The second brake B2 (equal to the low brake LOW/B) is a brake that selectively stops the rotation of the third sun gear S3 with respect to the transmission case Case. The third brake B3 (equal to the 2346 brake 2346/B) is a brake that selectively stops the rotation of the third connecting member M3, which connects the first sun gear S1 and the second sun gear S2, with respect to the transmission case Case. The fourth brake B4 (equal to the reverse brake R/B) is a brake that selectively stops the rotation of the fourth carrier PC3 with respect to the transmission case Case.

FIG. 5 is a diagram illustrating an engagement operation table showing the engagement states of the various frictional elements for each of the gear-shift steps in the automatic transmission AT carried on an FR hybrid vehicle where the control device of one embodiment of the invention is adopted. Here, in FIG. 5, mark O indicates that the corresponding frictional element is hydraulically engaged in the drive state, and the mark (O) indicates that the corresponding frictional element is hydraulically engaged in the coasting state (the one-way clutch operation in the drive state). No mark indicates that the frictional element is in the disengaged state.

As to be explained below, the 7 forward gear-shift steps and the 1 reverse gear-shift step can be realized when as one engaged frictional element among the various frictional elements arranged in the transmission gear mechanism with the configuration is disengaged, and one disengaged frictional element is engaged.

That is, in the "gear-shift step 1," only the second brake B2 is in the engaged state. As a result, the first one-way clutch F1 and the second one-way clutch F2 are engaged. In the "gear-shift step 2," the second brake B2 and the third brake B3 are in the engaged state, and the second one-way clutch F2 is engaged. In the "gear-shift step 3," the second brake B2, the third brake B3 and the second clutch C2 are in the engaged state, and both the first one-way clutch F1 and the second one-way clutch F2 are not engaged. In the "gear-shift step 4," the third brake B3, the second clutch C2 and the third clutch C3 are in the engaged state. In the "gear-shift step 5," the first clutch C1, the second clutch C2 and the third clutch C3 are in the engaged state. In the "gear-shift step 6," the third brake B3, the first clutch C1 and the third clutch C3 are in the engaged state. In the "gear-shift step 7," the first brake B1, the first clutch C1 and the third clutch C3 are in the engaged state, and the first one-way clutch F1 is engaged. In the "reverse gear-shift step," the fourth brake B4, the first brake B1 and the third clutch C3 are in the engaged state.

Figure 6:
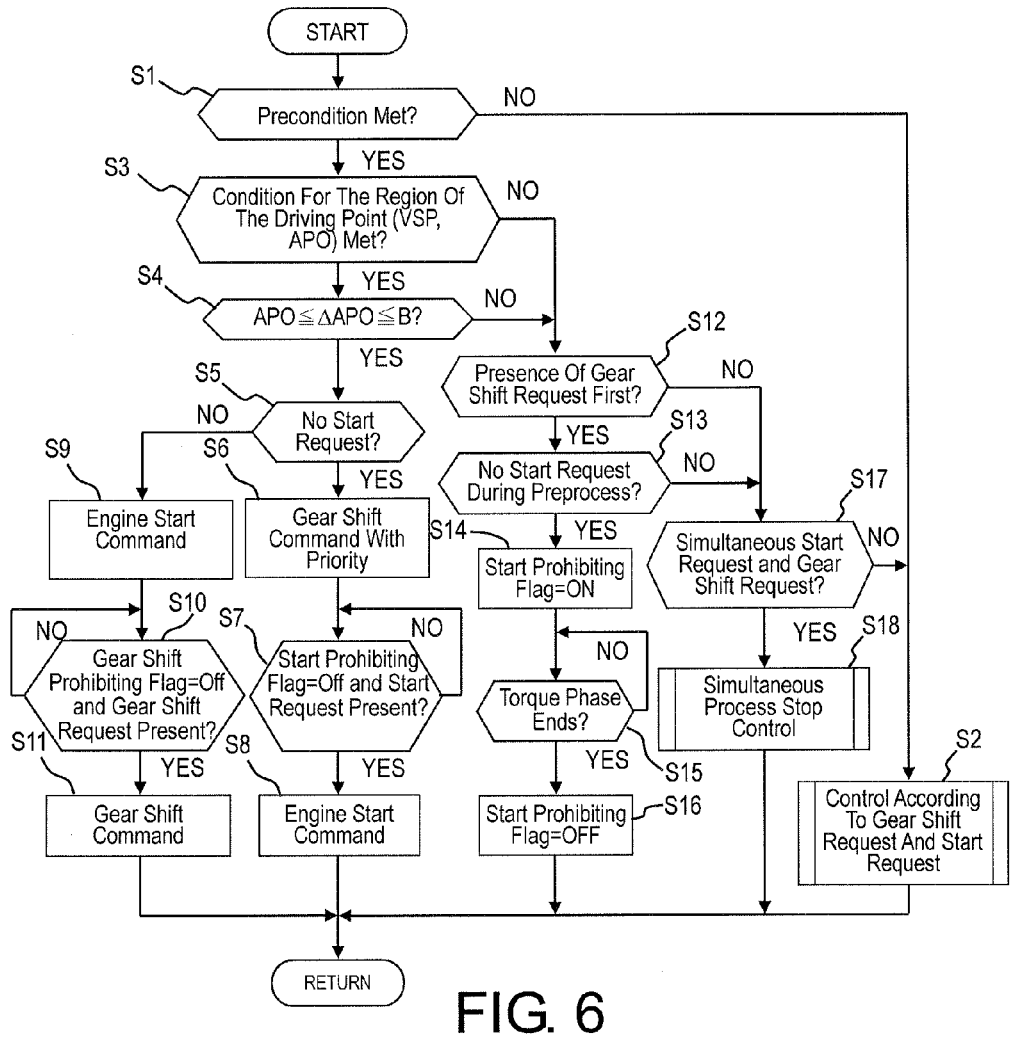
FIG. 6 is a flowchart illustrating the configuration and the flow of the gear shift priority control process carried out by the integrated controller in one embodiment of the present invention.

FIG. 6 is a flowchart illustrating the configuration and the flow of the gear shift priority control process carried out by the integrated controller 10 (the controller) in one embodiment of the present invention. In the following, the various steps of the operation shown in FIG. 6 will be explained.

In step S1, a determination is made regarding whether the precondition condition has been met. If the result of the determination is YES (the precondition has been met), the operation goes to step S3. If NO (the precondition has not been met), the operation goes to step S2. Here, the precondition is as follows.

The vehicle acceleration is on the acceleration side. If the acceleration is not on the deceleration side, the gear shift priority is not adopted.

The road gradient is smaller than the prescribed value (%). If the road gradient is greater than or equal to the prescribed value, the gear shift priority is not adopted.

The gear shift is an up gear shift from the gear-shift step 1→the gear-shift step 2 or from the gear-shift step 2→the gear-shift step 3. For the up gear shift from the gear-shift step 3→the gear-shift step 4 or higher, the frequency is low, and the gear shift priority is not adopted.

The ASC mode is the "normal mode" or "eco mode." If the ASC mode is in the other modes, there is no engine start line.

In step S2, as a continuation of the determination in step S1 that the precondition has not been met, the engine start control and the gear shift control are carried out according to the gear shift request and the start request, and the operation then goes to RETURN.

Figure 3:
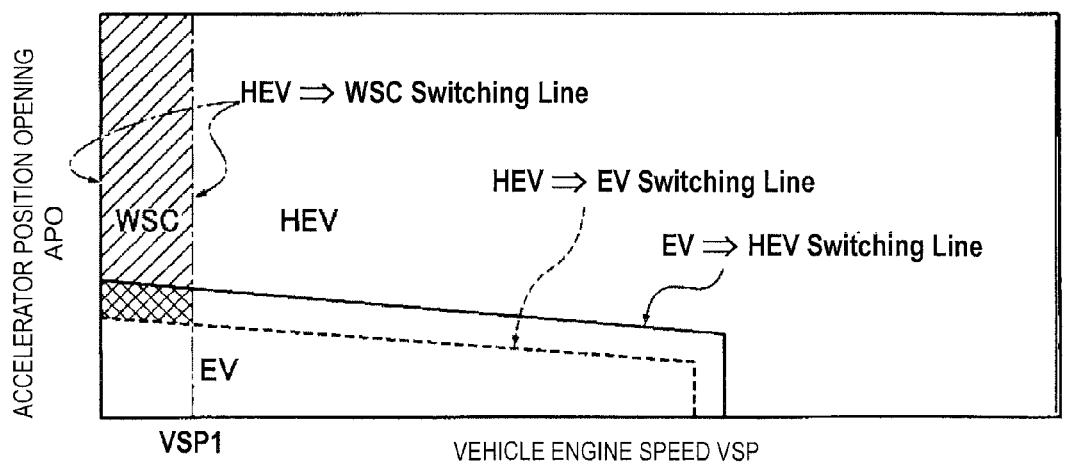
FIG. 3 is a view showing an example of the EV-HEV selection map set by the mode selection unit of the integrated controller 10 in one embodiment of the present invention.

In step S3, as a continuation of the determination in step S1 that the precondition has been met, a determination is made regarding whether the driving points (VSP, APO) on the two maps shown in FIG. 2 and FIG. 3 are present in the neighboring region (see the F region in FIG. 9) wherein there is a high possibility of the simultaneous crossing of the up gear shift line and the engine start line. If the determination result is YES (they are present in the neighboring region), the operation goes to step S4. If NO (they are absent in the neighboring region), the operation goes to step S12. Here, the neighboring region is set as the triangular region or another polygonal region that connects from the position of the crossing between the up gear shift line and the engine start line to the point on the start line that deviates a little to the lower vehicle speed side and the point on the gear shift line that deviates a little to the lower accelerator position side. Here, when the lower limit of vehicle speed passes the neighboring region by the idle rotational speed of the engine ENG, the neighboring region is limited by the lower limit of the vehicle speed.

In step S4, as a continuation of the determination in step S3 that the neighboring region have them, a determination is made regarding whether they are in the range where the accelerator position variation rate $\Delta APO$ is over the first reference value A and below the second reference value B. If the determination result is YES ($A \leq \Delta APO \leq B$), the operation goes to step S5. If NO ($A > \Delta APO$, $\Delta APO > B$), the operation goes to step S12. Here, the condition that $A \leq \Delta APO \leq B$ is the condition for determining that the accelerator pedal compression operation is carried out for increasing the vehicle speed VSP after the EV start. The condition of step S3 and step S4 corresponds to the condition for the simultaneous output prediction in predicting that the gear shift request and the start request are output at the same time.

In step S5, as a continuation of the determination in step S4 that $A \leq \Delta APO \leq B$, a determination is made regarding whether there is no output of the start request with or before the determination of $A \leq \Delta APO \leq B$. If the determination result is YES (there is no start request), the operation goes to step S6. If NO (there is a start request), the operation goes to step S9. Here, the condition in step S5 corresponds to the condition of the gear shift command priority permission that permits the priority of the gear shift command based on the request for the gear shift.

In step S6, as a continuation of the determination in step S5 that there is no start request, a gear shift priority command is output irrelevant to the fact that there is no output of the gear shift request, and the operation then goes to step S7. The gear shift priority command is output, and the predicted up gear shift control starts.

In step S7, as a continuation of the output of the gear shift priority command in step S6, a determination is made regarding whether the start prohibiting flag is OFF and whether there is a start request. If the determination result is YES (start prohibiting flag is OFF, and there is start request), the operation goes to step S8. If NO (start prohibiting flag is ON, or there is no start request), the determination of step S7 is repeated.

In step S8, as a continuation of the determination in step S7 that the start prohibiting flag is OFF and there is a start request, an engine start command is output, and the operation then goes to RETURN.

In step S9, as a continuation of the determination in step S5 that there is a start request, an engine start command is output according to the request, and the operation then goes to step S10.

In step S10, as a continuation of the output of the engine start command in step S9, a determination is made regarding whether the gear shift prohibiting flag is OFF and there is a gear shift request. If the determination result is YES (gear shift prohibiting flag is OFF, and there is a gear shift request), the operation goes to step S11; if NO (gear shift prohibiting flag is ON, or there is no gear shift request), the determination of step S10 is repeated.

In step S11, as a continuation of the determination in step S10 that the gear shift prohibiting flag is OFF, and there is a gear shift request, a gear shift command is output, and the operation then goes to RETURN.

In step S12, as a continuation of the determination in step S3 that they are not in the neighboring region or that $A > \Delta APO$, $\Delta APO > B$, a determination is made regarding whether there is a gear shift request prior to the start request. If the determination result is YES (there is a gear shift request), the operation goes to step S13; if NO (there is no gear shift request), the operation goes to step S17. Here, when a determination is made that there is the gear shift request with priority, a gear shift command is output, and the gear shift control starts.

In step S13, as a continuation of the determination in step S12 that there is a gear shift request, a determination is made regarding whether there is no start request in the preprocess in the gear shift control. If the determination result is YES (there is no start request in the preprocess), the operation goes to step S14. If NO (there is a start request in the preprocess), the operation goes to step S17. Here, as the preprocess, the process period is from the time when the gear shift command gear ratio NEXTGP_MAP becomes ON to the time when the control gear ratio NEXTGP becomes ON, and the process ends according to the gear ratio and a timer. Step S12 and step S13 correspond to the start prohibiting priority permission condition that gives a permission for the priority of the start prohibiting flag.

In step S14, as a continuation of the determination in step S13 that there is no start request during the preprocess, the start prohibiting flag is set ON by the priority operation in the preprocess in the gear shift control, and the operation then goes to step S15.

In step S15, as a continuation of the priority of the start stop flag in step S14, a determination is made regarding whether the torque phase carried out after the preprocess in the gear shift control has ended. If the determination result is YES (the torque phase has ended), the operation goes to step S16; if NO (the torque phase has not ended), the determination in step S15 is repeated.

In step S16, as a continuation of the determination in step S15 that the torque phase has ended, the start prohibiting flag is switched from ON to OFF, and the operation goes to RETURN.

In step S17, as a continuation of the determination in step S12 that there is no gear shift request or the determination in step S13 that there is a start request during the preprocess, a determination is made regarding whether the start request and the gear shift request occur at the same time. If the determination result is YES (the start request and the gear shift request occur at the same time), the operation goes to step S18; if NO (the start request and the gear shift request do not occur at the same time), the operation goes to step S2.

In step S18, as a continuation of the determination in step S17 that the start request and the gear shift request occur at the same time, the simultaneous process prohibiting control is carried out as follows: once the start command or the gear shift command is cancelled, after the cancellation, the time is shifted corresponding to the communication delay time, and the cancelled command is output again. The operation then goes to RETURN.

In the following, the operation will be explained. The operation in the control device of the FR hybrid vehicle in one embodiment of the present invention will be explained with respect to the following portions: "about the engine start control, the gear shift control and the prohibiting flag;" the "necessity of the gear shift priority control;" the "gear shift priority control operation;" the "start prohibiting flag priority control operation;" and the "simultaneous process prohibiting control operation."

First, the "engine start control" carried out under the command of the integrated controller 10 will be explained. When the vehicle runs in the EV mode, if the engine start line crosses the accelerator positionAPO, an engine start request is generated; based on the engine start request, the "engine start control" is started. In the engine start control, first, the torque capacity of the second clutch CL2 is controlled so that the second clutch CL2 is made to slip to the semi-clutch state. Here, after a determination is made that the slip starts for the second clutch CL2, the engagement of the first clutch CL1 is started, and the engine rotational speed is increased by cranking, with the motor/generator MG as the starting motor. Then, when the engine rotational speed reaches the level that allows for the initial explosion, the engine ENG is set in combustion operation; when the motor rotational speed approaches the engine rotational speed, the first clutch CL1 is completely engaged. Then, the second clutch CL2 is locked up, and the mode makes the transition to the HEV mode.

In the following, the "gear shift control" carried out under command from the AT controller 7 will be explained independent of the "engine start control." In the running state, as the driving point (VSP, APO) crosses the up gear shift line or the down gear shift line on the shift map shown in FIG. 2, a gear shift request is generated. Based on the gear shift request, the "gear shift control" is started. In the gear shift control, basically, the replaced hydraulic control is carried out so that one engaged frictional element is disengaged, and one disengaged frictional element is engaged. This gear shift control is carries out in the following flow until the gear shift has ended: preprocess control→torque phase control→initial control→CL synchronization phase control post-process control. In this case, from the gear shift start to the gear shift end, management is carried out individually for the following divided portions: preprocess/the torque phase/the initial phase/the CL synchronization phase/post-process. In the individual phase management, the timer information and the gear ratio change information calculated from the input/output rotational speed of the automatic transmission AT, etc. are used to monitor the degree of progress of the gear shift operation.

Basically, the start prohibiting flag that prohibits the engine start control is set to ON (stop) in the following listed (a) through (d), and the start prohibiting flag equal to OFF (permission) is set otherwise.

(a) In the case of the gear shift phase, in which the slip cannot be maintained by the second clutch CL2 by the capacity balance between the second clutch CL2 (the slip clutch) that is made to slip by the engine start control and the gear shift clutch related to gear shift. As a specific example, the engine start is prohibited in the preprocess in the 1→2 up gear shift.

(b) During the gear shift, when the second clutch CL2 made to slip by the engine start control and the engaged clutch in the gear shift as the second clutch enters the engine start control. As a specific example, the engine start is prohibited during the 2→3 up gear shift and the 3→4 up gear shift.

(c) During the gear shift using the one-way clutch. As a specific example, the engine start is prohibited during the 3→2 down gear shift and during the 2→1 down gear shift.

(d) When in the gear shift phase region wherein the motor rotational speed control is carried out in the gear shift. As a specific example, the engine start is prohibited as the gear shift phase in a region in the CL synchronization phase.

Basically, the gear shift prohibiting flag that prohibits the gear shift control equal to ON (stop) is set by the following listed (e) through (g), and the gear shift prohibiting flag equal to OFF (permission) is set otherwise.

(e) When there is gear shift during the motor rotational speed control and it is impossible to determine the gear ratio on the gear shift control side. As a specific example, during the engine start, the up gear shift entire region stop is adopted. Also, in the WSC mode, the entire-region stop is set for both the up/down gear shift.

(f) When the gear shift is due to constant acceleration, and there is a high request for shock reduction by the driver. As a specific example, the power ON down gear shift is prohibited by a constant acceleration during the engine start. Here, the prohibiting region is set according to the accelerator position condition.

(g) When the gear shift has difficulty managing the transmission input torque, and there is a high possibility of the influence on the shock. As a specific example, the entire-region stop is set together with the up/down gear shift in the engine start in coating running. In the power up start (starting without making the CL2 to slip), the entire-region stop is set together with the up/down gear shift.

Figure 7:
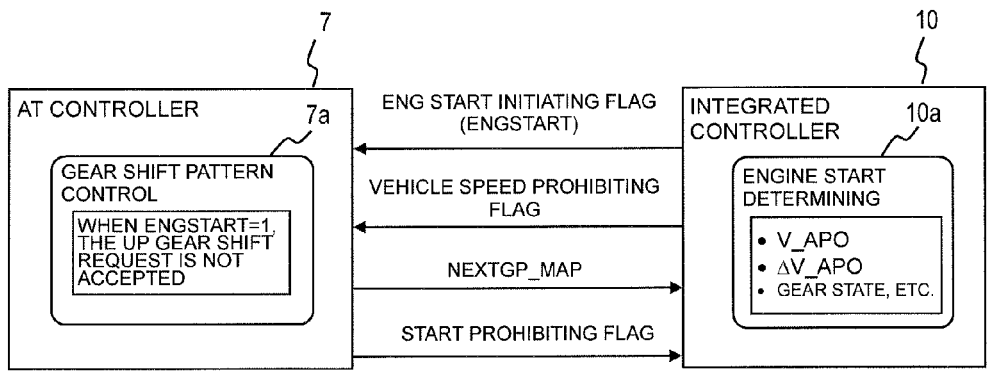
FIG. 7 is a block diagram illustrating the information exchange via the CAN communication line for the engine start control and the gear shift control using the integrated controller and the AT controller in one embodiment of the present invention.

FIG. 7 shows the engine start control by the integrated controller 10 and the AT controller 7 and the information exchange by the CAN communication line of the gear shift control in one embodiment of the present invention. In the following, the necessity of the gear shift priority control in one embodiment of the present invention will be explained.

As a characteristic feature of the control device, a gear shift prohibiting flag is set on the side of the integrated controller 10 that has the information related to the engine start/shutdown control and is output to the AT controller 7. Also, the start prohibiting flag is set on the side of the AT controller 7 having the information related to the gear shift control and is set to the integrated controller 10. For example, the reason is as follows: when the gear shift prohibiting flag and the start prohibiting flag are set on the integrated controller 10 side, inputting the fine information related to the gear shift control from the AT controller 7 is necessary. With respect to this, instead of the input of the information related to the gear shift control from the AT controller 7, it is possible to set the start prohibiting flag with a high degree of precision.

As shown in FIG. 7, the AT controller 7 includes a gear shift pattern control section 7*a*. In this gear shift pattern control section 7*a*, basically, when there is a request for the engine start, the up gear shift request is not accepted. As shown in FIG. 7, the integrated controller 10 includes the engine start determining section 10*a*, and this engine start determining section 10*a* determines whether the engine starts based on the necessary information.

That is, the integrated controller 10 carries out the start request determination and the final start execution determination and sends the result to the AT controller 7. Here, the AT controller 7 sets the start prohibiting flag during the gear shift request and the gear shift control and sends the result to the integrated controller 10. In this system, for example, the start prohibiting flag is not sent from the AT controller 7 in the last round operation job, so that, in the next-round operation job, the integrated controller 10 determines the start request and the final start execution. However, when the start prohibiting flag is sent by the AT controller 7 at the same time as the start request and the final start execution determination, the engine start is carried out in the start prohibiting region. In order to prohibit the engine start in the start prohibiting region, carrying out the gear shift priority control is necessary.

Figure 8:
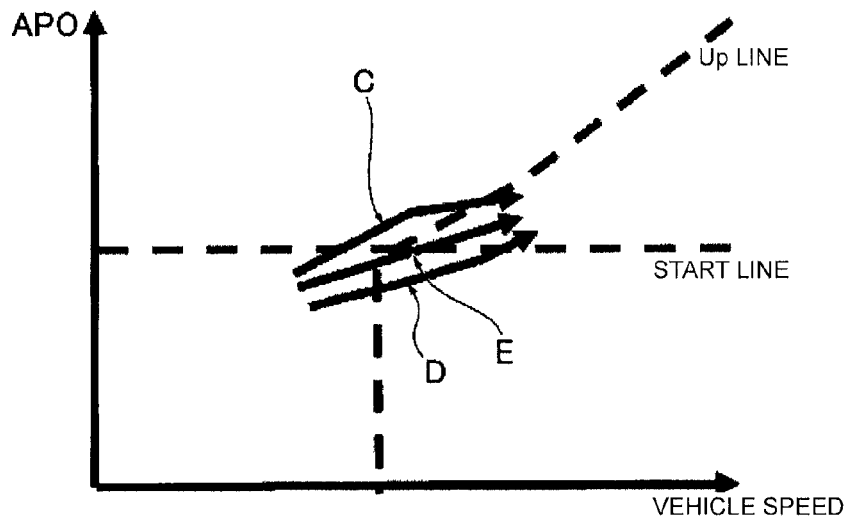
FIG. 8 is a diagram illustrating an example of the driving point operation pattern on the map when a prediction is made regarding the simultaneous output of the up gear shift request and the engine start request with the gear shift priority control adopted according to one embodiment of the invention.

FIG. 8 is a diagram illustrating an example of the driving point operation pattern on the map when a prediction is made that the up gear shift request and the engine start request are output at the same time when the gear shift priority control in one embodiment of the present invention is adopted. Based on FIG. 8, an example of the adoption of the gear shift priority control in one embodiment of the present invention will be explained.

First, in both the shift map (the shift schedule) shown in FIG. 2 and the EV-HEV selection map shown in FIG. 3, the horizontal line represents the vehicle speed VSP, and the vertical line represents the accelerator position opening APO. Due to the shift of the driving point (VSP, APO), as the driving point crosses the up gear shift line, an up gear shift request is generated; when the driving point crosses the engine start line (EV→HEV line), an engine start request is generated. Consequently, as shown in FIG. 8, in the vicinity of the engine start line and the up gear shift line, even when the accelerator compression patterns by the driver are found to be almost the same, the performance still varies due to the shifting pattern of the driving point (VSP, APO).

For example, when the driving point (VSP, APO) shifts as indicated by the arrow C in FIG. 8, the up gear shift is carried out after the engine start. When the driving point (VSP, APO) shifts as indicated by the arrow D in FIG. 8, the engine starts after the up gear shift. When the driving point (VSP, APO) shifts as indicated by the arrow E in FIG. 8, the up gear shift and the engine start take place at almost the same time.

That is, for the shift pattern of the driving point (VSP, APO) as indicated by the arrow E in FIG. 8, when both the gear shift request in the AT controller 7 and the start request in the integrated controller 10 appear at the same time, there is an option for carrying out the engine start in the start prohibiting region in the gear shift control. In this way, when the driving point (VSP, APO) is near the up gear shift line and the engine start line, it is possible to handle the driving point by adopting the gear shift priority control in one embodiment of the present invention.

The operation of the gear shift priority control in one embodiment of the present invention will be explained based on FIG. 6, a flow chart, and FIG. 9, a diagram illustrating the operation.

During the running of the vehicle, when the precondition is not met, in the flow chart shown in FIG. 6, the following flow is repeated: step S1→step S2→RETURN. That is, in step S2, the engine start control and the gear shift control are carried out according to the gear shift request, the start request, the start prohibiting flag and the gear shift prohibiting flag.

When the vehicle makes an accelerated running from the EV start, if the precondition, the simultaneous output prediction condition and the gear shift priority permission condition are all met, in the flow chart shown in FIG. 6, the following flow is carried out: step S1→step S3→step S4→step S5→step S6. Here, in step S6, the priority gear shift command is output; based on the output of the gear shift priority command, the predicted up gear shift control is started. Then, in step S7, a determination is made regarding whether the start prohibiting flag is OFF and whether there is the start request. If the determination result is YES, the operation goes to step S8, and the engine start command is output.

That is, when the precondition, the simultaneous output prediction condition, and the gear shift priority command permission condition are all met, the following time sequence is adopted: the output of the start request according to the prediction timing→the output of the gear shift request or the start request according to the crossing of the gear shift line or the start line→the output of the engine start command. That is, the time difference process that the output of the gear shift command is prior to the output of the engine start command is guaranteed. Consequently, even when there is a communication delay via the CAN communication line 11 and an operation delay between the integrated controller 10 and the AT controller 7, it is still possible to reliably avoid the problem of simultaneous processing of entering the engine start mode in the start prohibiting region during the gear shift control by means of the gear shift priority command based on the prediction.

For example, as indicated by the arrow G in FIG. 9, at the time of the determination of the simultaneous output prediction condition, there is a high possibility in the neighboring region of crossing the up gear shift line and the engine start line at the same time, and the accelerator position variation rate $\Delta APO$ is in the range over the first reference value A and below the second reference value B. In this case, the gear shift priority command is output at the time of the determination of the simultaneous output prediction condition as the start point of the arrow G shown in FIG. 9. Consequently, even when the communication delay and the operation delay between the integrated controller 10 and the AT controller 7 exist, it is still possible to prevent the generation of a large shock caused by entering the engine start in the start prohibiting region during the gear shift control.

On the other hand, even when both the precondition and the simultaneous output prediction condition are met, and the gear shift priority condition is met, as the start request is output at the same time or with priority, and the gear shift command priority permission condition is not met, in the flow chart shown in FIG. 6, the following sequence takes place: step S1→step S3→step S4→step S5 step S9. Then, in step S9, the engine start command is output, and, based on the output of this engine start command, the engine start control is started with priority. Then, in step S10, a determination is made whether the gear shift prohibiting flag is OFF and whether there is a gear shift request. If the determination result is YES, the operation goes to step S11, and the gear shift command is output.

For example, as indicated by the arrow H in FIG. 9, at the time of determining the simultaneous output prediction condition, there is a high possibility in the neighboring region of crossing the up gear shift line and the engine start line at the same time, and the accelerator position variation rate $\Delta APO$ is taken to be in the range over the first reference value A and below the second reference value B. In this case, when the accelerator pedal is compressed quickly, after start of the engine start, the gear shift control is carried out, and no problem takes place by avoiding the simultaneous control of the engine start control and the gear shift control.

Figure 9:
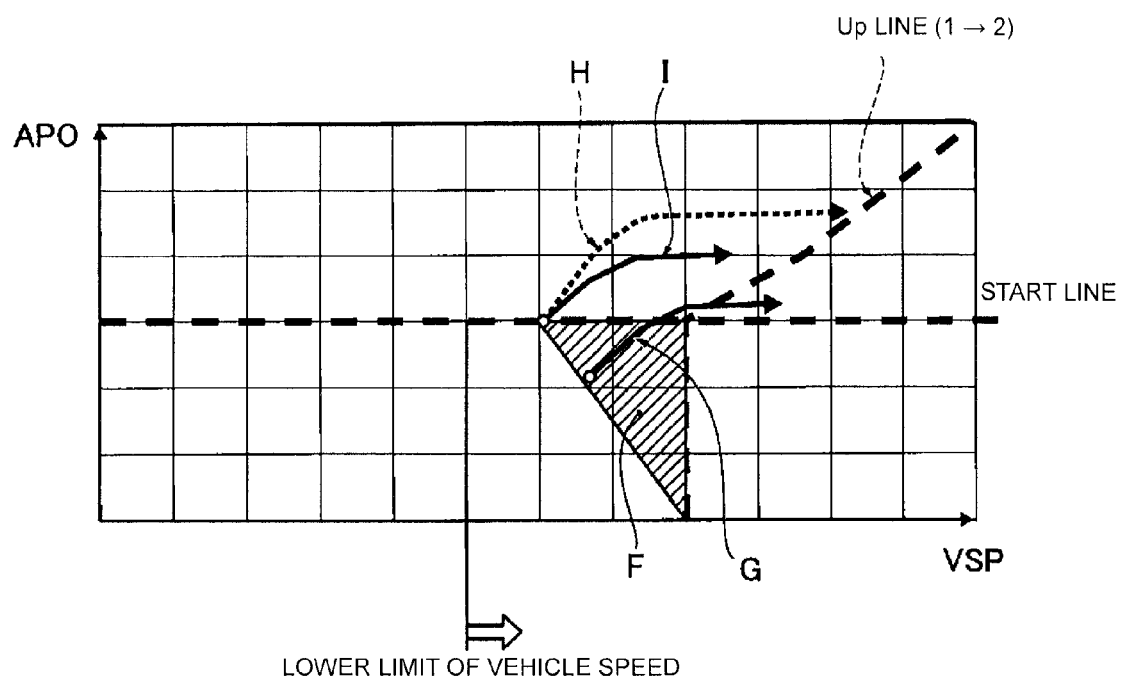
FIG. 9 is a diagram illustrating the gear shift priority control operation when a prediction is made regarding the simultaneous output of the gear shift request and the start request in the control device of one embodiment of the present invention.

Here, as indicated by the arrow I in FIG. 9, at the time of determining the simultaneous output prediction condition, there is a high possibility in the neighboring region of crossing of the up gear shift line and the engine start line at the same time. However, the accelerator position variation rate $\Delta APO$ is below the first reference value A. In this case, because the simultaneous output prediction condition is not met, the engine start control and the gear shift control are carried out according to the gear shift request, the start request, the start prohibiting flag, and the gear shift prohibiting flag.

As explained above, in one embodiment of the present invention, when a prediction is made that the gear shift request and the start request arrive at the same time and that the gear shift command may have the priority, the configuration having priority for the gear shift command is adopted. As a result, the following merits can be realized.

- It is possible to prevent the generation of a large shock caused by the entering of the engine start in the start prohibiting region during the gear shift caused by the delay in the CAN communication between the integrated controller 10 and the AT controller 7 and the delay in the operation.
- It is possible to provide a stable gear shift/start performance independent of how the driver steps down on the accelerator pedal in the vicinity of the up gear shift line and the engine start line.
- It is possible to improve the mileage because decreasing the transmission input rotational speed and performing the engine start in the low-rotational speed region by giving priority to the up gear shift are possible.

In the following, the operation of the start prohibiting flag priority control in one embodiment of the present invention will be explained with reference to the flow chart shown in FIG. 6 and the operation explanatory diagram shown in FIG. 10.

The precondition includes the accelerated running from the established EV start, etc. However, when the output predicting condition is not met while the start prohibiting priority permission is met, in the flow chart shown in FIG. 6, the following flow takes place: step S1→step S3 (→step S4)→step S12→step S13→step S14. Here, in step S14, the start prohibiting flag at ON is taken as the priority; based on the output of this start prohibiting flag equal to 0, the engine start is prohibited even when there is an engine start request during the up gear shift control. Then, in step S15, a determination is made regarding whether the torque phase carried out as a continuation of the preprocess in the gear shift control has ended. In the next step S16, the start prohibiting flag is switched from ON to OFF.

Figure 10:
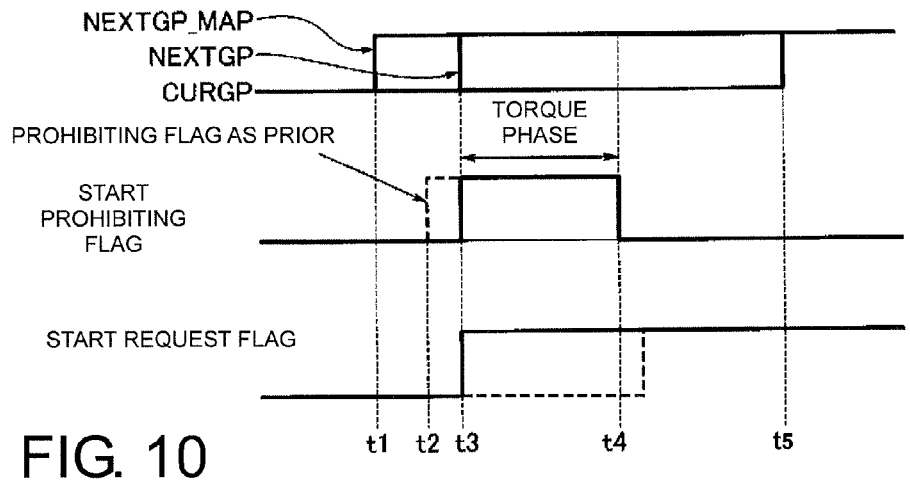
FIG. 10 is a time chart showing the characteristics of the start prohibiting flag priority control operation when no prediction is made regarding the simultaneous output of the gear shift request and the start request in the control device of one embodiment of the present invention.

For example, as shown in FIG. 10, in the case of the 1→2 up gear shift, first, at the time t1, the gear shift command gear ratio NEXTGP_MAP becomes ON; at the time t3, the control gear ratio NEXTGP becomes ON. At the time t4, the start prohibiting flag becomes OFF. Then, at the time t5, the current gear ratio CURGP becomes ON. The process from the time t1 to the time t3 is the preprocess. As the preprocess ends according to the gear ratio or the timer, it is possible to back calculate from the timer value to have the priority for the start prohibiting flag at the time t2.

As explained above, when it is impossible to predict that the gear shift request and the start request arrive at the same time, and when the start prohibiting flag can be set with priority, the configuration in which the start prohibiting flag is set as priority is adopted. According to the configuration of the priority for the start prohibiting flag, when the simultaneous output prediction condition is not met, it is possible to prevent the generation of a large shock caused by entering the engine start in the start prohibiting region during the gear shift due to the CAN communication delay between the integrated controller 10 and the AT controller 7 and due to the delay in the operation.

In the following, the simultaneous process prohibiting control in one embodiment of the present invention will be explained with reference to the flow chart shown in FIG. 6 and the operation explanation diagram shown in FIGS. 11 and 12.

The precondition includes the accelerated running from the established EV start, etc. However, when both the simultaneous output prediction condition and the start prohibiting priority permission condition are not met at the same time, in the flow chart shown in FIG. 6, the following flow takes place: step S1→step S3 (→step S4)→step S12 (→step S13)→step S17→step S18. Here, in step S18, once the start command or the gear shift command is cancelled, a time corresponding to the communication delay is shifted, and the cancelled command is output again to carry out the simultaneous process prohibiting control.

Figure 11:
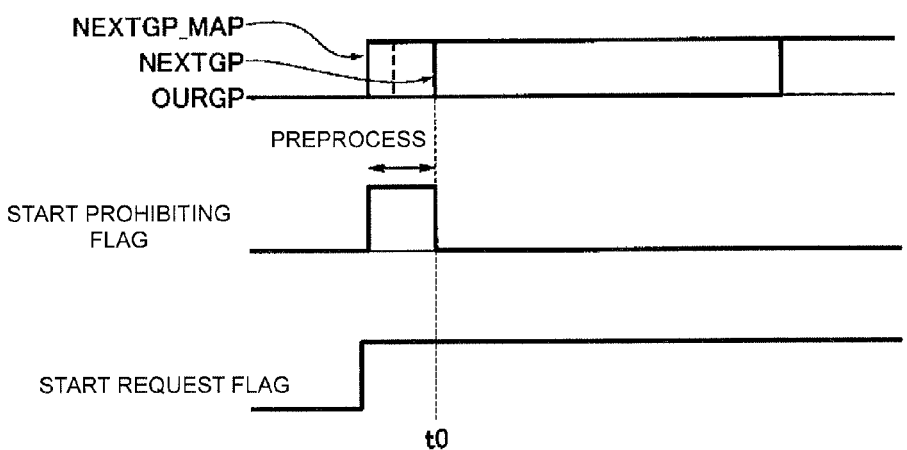
FIG. 11 is a diagram illustrating the operation of the gear shift cancellation among the simultaneous process prohibiting control operation in the control device of one embodiment of the present invention.

For example, as shown in FIG. 11, the start request and the gear shift request take place at the same time. However, when the start prohibiting flag is set during the preprocess of the gear shift control, from the time t0 when the start prohibiting flag is turned down, the engine start begins according to the start request flag, and the gear shift control is cancelled. In addition, once the gear shift control is cancelled, after that, the cancelled gear shift request is generated again. In this case, when the gear shift prohibiting flag is set as determined according to the gear shift line, the operation follows the gear shift line.

The operation search in the simultaneous process prohibiting control is as follows. In the case indicated by the arrow J in FIG. 12, (J) the start of the up gear shift→the start request during the preprocess→the up gear shift cancellation→start only (even when the down gear shift line is crossed, the down gear shift request substantially does not work)

Figure 12:
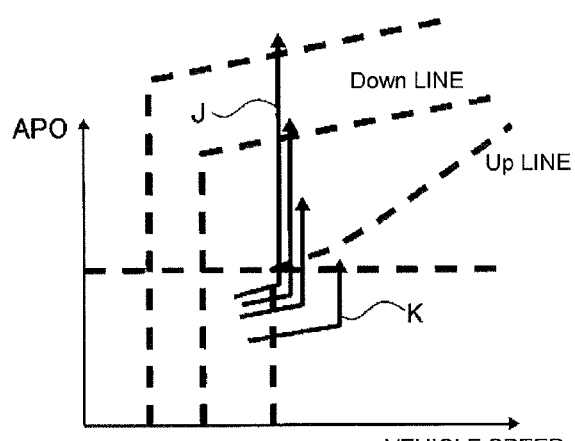
FIG. 12 is an explanatory diagram illustrating the operation of the gear shift cancellation arranged among the simultaneous process-prohibiting control operation in the control device of one embodiment of the present invention.

In the case indicated by the arrow K in FIG. 12, (K) the start of the up gear shift→the start request during the preprocess→the up gear shift cancellation→the up gear shift after start.

As explained above, in one embodiment of the present invention, when a prediction is not made that the gear shift request and the start request arrive at the same time, and when the start prohibiting flag cannot have priority, once the start command or the gear shift command is cancelled, after a time corresponding to the delay in the communication, the cancelled command is generated again. As a result, the following merits can be realized.

- It is possible to prevent the generation of a large shock caused by the entering of the engine start in the start prohibiting region during the gear shift caused by the delay in the CAN communication between the integrated controller 10 and the AT controller 7 and the delay in the operation.
- As the command is generated again after a shift in time corresponding to the delay in the communication, it is possible to make the process for the start and gear shift at the same time with the best possible effect, and minimizing the start lag and the gear shift lag is possible.

In the following, the effects will be explained. For the control device of the FR hybrid vehicle in one embodiment of the present invention, the effects listed below can be realized.

(1) The control device of the FR hybrid vehicle comprises an engine ENG, a motor (motor/generator MG) that is arranged in the driving system between the engine ENG and the left rear wheel RL and right rear wheel RR, and carries out driving for the start of the engine ENG and driving of the left rear wheel RL and right rear wheel RR, a mode switching means (the first clutch CL1) that is arranged in the connecting section between the engine ENG and the motor (motor/generator MG), and enacts mode switching between the hybrid vehicle mode (HEV mode) that takes both the engine ENG and the motor (motor/generator MG) as the driving source and the electrically driven vehicle mode (EV mode) that takes only the motor (motor/generator MG) as the driving source, an automatic transmission AT that is included between the motor (motor/generator MG) and the left rear wheel RL and right rear wheel RR and comprises plural gear-shift steps with different gear-shift ratios, respectively, and controllers (the integrated controller 10 and the AT controller 7) that carry out the start control of the engine ENG based on the request when mode transition is made from the electrically driven vehicle mode (EV mode) to the hybrid vehicle mode (HEV mode), and, at the same time, the gear shift control for shifting the gear-shift step of the automatic transmission AT from the current gear-shift step to the requested gear-shift step based on the gear shift request in running; the controllers (the integrated controller 10 and the AT controller 7) output the gear shift command prior to the engine start command when the simultaneous output prediction condition that predicts the simultaneous output of the gear shift request and the start request (YES in step S3 and step S4) (FIG. 6). Consequently, it is possible to prevent the generation of a large shock caused by the entering of the engine start in the start prohibiting region during the gear shift.

(2) The controller (the integrated controller 10) outputs a gear shift command prior to the engine start command when the simultaneous output prediction condition that predicts the simultaneous output of the gear shift request and the start request at the same time is met (YES in step S3 and step S4), and the gear shift command priority permission condition that permits the priority of the gear shift command based on the gear shift request is met (YES in step S5) (FIG. 6). Consequently, when the simultaneous output prediction condition and the gear shift command priority permission condition are met at the same time, it is possible to initiate the gear shift control reliably prior to the engine start by outputting the gear shift command prior to the engine start command.

(3) The controller (the integrated controller 10) includes a start prohibiting flag priority control section (step S14) that outputs a start prohibiting flag prior to the gear shift prohibiting flag when the simultaneous output prediction condition that predicts simultaneous the output of the gear shift request and the start request at the same time is not met (NO in step S3 and step S4), and the start prohibiting priority permission condition that permits the start prohibiting flag with priority (YES in step S12 and step S13) (FIG. 6). Consequently, in addition to the effects of (1) and (2), when the simultaneous output prediction condition is not met, even when there is a delay in communication between the engine start controller (the integrated controller 10) and the gear shift controller (the AT controller 7) and there is a delay in the operation, it is still possible to prevent the generation of a large shock caused by entering the engine start in the start prohibiting region during the gear shift.

(4) The controllers include the engine start controller (the integrated controller 10) and the gear shift controller (the AT controller 7) that allow for information exchange by communication. The controller (the integrated controller 10) has a simultaneous process prohibiting section (step S18) that works as follows: when the simultaneous output prediction condition that predicts simultaneous output of the gear shift request and the start request at the same time is not met (NO in step S3 and step S4), when the start prohibiting priority permission condition that permits the start prohibiting flag with priority is not met (NO in step S12 and step S13), and when the start request and the gear shift request are output at the same time (YES in step S17), once the start command or the gear shift command is cancelled, after the time is shifted corresponding to the delay in communication, the command is output again (FIG. 6). Consequently, in addition to the effects of (1) through (3), there is also the following effect: when both the start request and the gear shift request are output at the same time, even when there is a delay in communication between the engine start controller (the integrated controller 10) and the gear shift controller (the AT controller 7), and there is a delay in operation, it is still possible to prevent the generation of a large shock caused by entering the engine start in the start prohibiting region during the gear shift, and, at the same time, minimizing the gear shift lag and the start lag is possible.

In the above, the control device of the hybrid vehicle has been explained with reference to one embodiment of the invention. However, the specific configuration is not limited to this one embodiment. As long as the main points of the invention related to the claims are observed, various modifications and additions to the design can be made.

One embodiment of the invention shows an example in which the second clutch CL2 is selected from the frictional elements included in the step-type automatic transmission AT. However, one may also adopt a scheme in which the second clutch CL2 is arranged separated from the automatic transmission AT. For example, the second clutch CL2 may be arranged separated from the automatic transmission AT between the motor/generator MG and the input shaft of the transmission, or the second clutch CL2 may be arranged separated from the automatic transmission AT between the output shaft of the transmission and the drive wheels.

In one embodiment of the present invention, as an example, the automatic transmission AT is a step-type automatic transmission having 7 forward gear-shift steps and 1 backwards gear-shift step. However, the number of the gear-shift steps is not limited to this example. The automatic transmission may have plural gear-shift steps of 2 or more.

In one embodiment of the present invention, as an example of the mode switching means between the HEV mode and the EV mode, the first clutch CL1 is shown. However, another mode switching means may be adopted for switching between the HEV mode and the EV mode. For example, one may adopt a differential apparatus or a power dividing apparatus that can display the clutch function without using a clutch, such as planetary gear, etc.

In one embodiment of the present invention, an example of the adoption of the control device in a rear-wheel drive hybrid vehicle is shown. However, the control device may also be adopted on a front-wheel drive hybrid vehicle. As a matter of fact, the control device may be adopted on any hybrid vehicle that carries an automatic transmission and includes the HEV mode and the EV mode as the running modes.

In one embodiment of the present invention, as the controllers, the integrated controller 10 and the AT controller 7 that can exchange information by communication are presented as an example. However, the present invention may also be adopted with an apparatus that has these controllers integrated in a single controller, and the single controller can have both the function corresponding to the integrated controller 10 and the function corresponding to the AT controller 7 in one embodiment of the present invention.

The invention claimed is:

1. A hybrid vehicle comprising:
    an engine;
    a motor operatively arranged between the engine and a drive wheel, and the motor being configured to start the engine to drive the drive wheel;
    a mode switch apparatus disposed between the engine and the motor, the mode switch apparatus being configured to switch a mode between a hybrid vehicle mode, in which the engine and the motor are acting as driving sources, and an electrically driven vehicle mode, in which only the motor is acting as a driving source;

an automatic transmission disposed between the motor and the drive wheel, and including a plurality of gear-shift steps with different gear-shift ratios; and a control system programmed to start the engine based on a start request when a mode transition takes place from the electrically driven vehicle mode to the hybrid vehicle mode, and that also carries out gear shift control for transition of a gear-shift step of the automatic transmission from a current gear-shift step to a requested gear-shift step based on a gear shift request;

the control system being further programmed to output a priority gear shift command prior to an engine start command when a simultaneous output prediction condition, which predicts a simultaneous output of the gear shift request and the start request based on a vehicle operating state of the vehicle, is met, and when a gear-shift command priority condition without the engine start request command is met; and the control system being further programmed to move out of a start prohibiting condition during gear-shift control when a start prohibiting flag is turned off and the engine start command is output under a condition that the engine start request exists, in order to start the engine after the priority gear-shift command is output.

2. The hybrid vehicle according to claim 1, wherein
the control system includes a start prohibiting flag priority control section, which is programmed to turn on the start prohibiting flag prior to a gear shift prohibiting flag when the simultaneous output prediction condition is not met and when a gear-shift request is present before an engine start request, and when an engine start request is not present in a preprocess period, and which is programmed to turn off the start prohibiting flag when a torque phase has ended under the gear-shift control after the start prohibiting flag is turned on.

3. The hybrid vehicle according to claim 2, wherein
the control system includes an engine start controller and a gear shift controller configured to exchange information by communication; and
the control system includes a simultaneous process prohibiting control section which is programmed to output again the engine start command or the gear shift command that was cancelled at a time corresponding to a time delay in the communication when the simultaneous output prediction condition is not met, and when a gear-shift request is not present before an engine start, or when an engine start request is present in the preprocess period, and when the engine start request and the gear shift request occur at the same time.

4. The hybrid vehicle according to claim 1, wherein
the control system includes an engine start controller and a gear shift controller configured to exchange information by communication; and
the control system includes a simultaneous process prohibiting control section which is programmed to output again the engine start command or the gear shift command that was cancelled at a time corresponding to a time delay in the communication when the simultaneous output prediction condition is not met, and when a gear-shift request is not present before an engine start, or when an engine start request is present in a preprocess period, and when the engine start request and the gear shift request occur at the same time.

5. The hybrid vehicle according to claim 1, wherein
the control system is further programmed to use a vehicle speed and an accelerator position in determining the vehicle operating state of the vehicle to determine when the simultaneous output prediction condition is met.

6. The hybrid vehicle according to claim 5, wherein
the control system includes a start prohibiting flag priority control section, which is programmed to turn on the start prohibiting flag prior to a gear shift prohibiting flag when the simultaneous output prediction condition is not met and when a gear-shift request is present before an engine start request, and when an engine start request is not present in a preprocess period, and which is programmed to turn off the start prohibiting flag when a torque phase has ended under the gear-shift control after the start prohibiting flag is turned on.

7. The hybrid vehicle according to claim 6, wherein
the control system includes an engine start controller and a gear shift controller configured to exchange information by communication; and
the control system includes a simultaneous process prohibiting control section which is programmed to output again the engine start command or the gear shift command that was cancelled at a time corresponding to a time delay in the communication when the simultaneous output prediction condition is not met, and when a gear-shift request is not present before an engine start, or when an engine start request is present in the preprocess period, and when the engine start request and the gear shift request occur at the same time.

8. The hybrid vehicle according to claim 5, wherein
the control system includes an engine start controller and a gear shift controller configured to exchange information by communication; and
the control system includes a simultaneous process prohibiting control section which is programmed to output again the engine start command or the gear shift command that was cancelled at a time corresponding to a time delay in the communication when the simultaneous output prediction condition is not met, and when a gear-shift request is not present before an engine start, or when an engine start request is present in a preprocess period, and when the engine start request and the gear shift request occur at the same time.

\* \* \* \* \*